Feb. 16, 1932.  H. BERLIAWSKY  1,845,577
AUTOMOBILE SHADE
Filed April 7, 1931
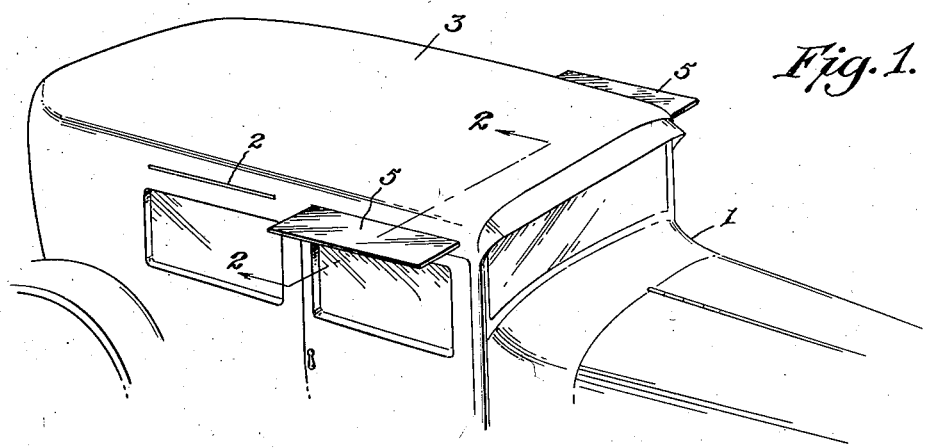
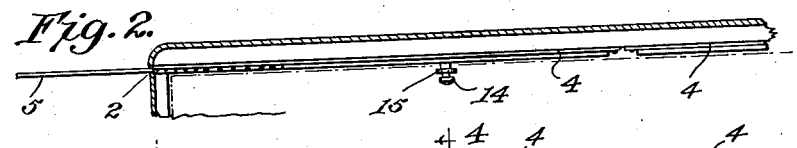
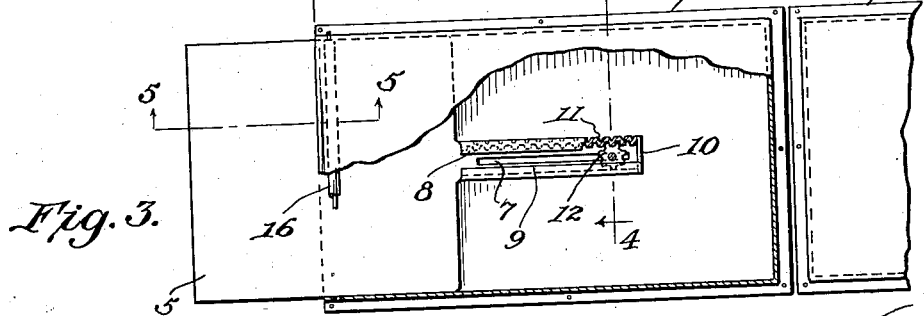
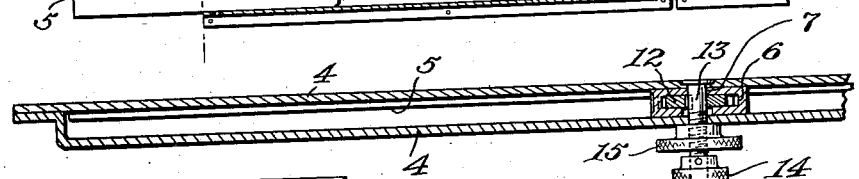
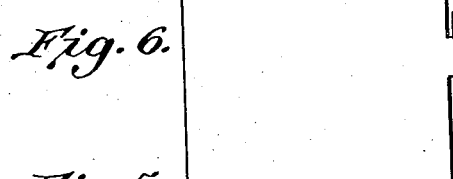
Inventor
Hyman Berliawsky
By Eccleston & Eccleston
Attorneys Patented Feb. 16, 1932

1,845,577

UNITED STATES PATENT OFFICE

HYMAN BERLIAWSKY, OF BALTIMORE, MARYLAND

AUTOMOBILE SHADE

Application filed April 7, 1931. Serial No. 528,349.

This invention relates to shades or screens for automobiles and has for its primary object to provide a simple and inexpensive shade construction which may be readily installed on all types of automobiles.

Another object of the invention resides in the provision of a shade construction individual to the several side windows of an automobile, and which may be operated from the interior of the vehicle either to render the shade operative to obstruct the sun's rays or to withdraw it when not needed to a concealed position so as to avoid the unsightly appearance usually presented by such devices.

Another object of the invention consists in the provision of a shade consisting essentially of two parts, namely the shade proper with an integral rack, and a pinion meshing with the rack to operate the shade to either operative or inoperative position.

Other objects and advantages of the invention will be apparent from the following description when taken in connection with the accompanying drawings, in which Figure 1 is a fragmentary perspective view of a conventional closed automobile with the novel shades installed thereon.

Figure 2 is a vertical sectional view taken on line 2—2 of Figure 1.

Figure 3 is a bottom plan view of two of the shades, parts being broken away to more clearly show the construction.

Figure 4 is a transverse sectional view taken on the line 4—4 of Figure 3.

Figure 5 is a detail sectional view taken on line 5—5 of Figure 3; and

Figure 6 is a plan view of a blank from which the shade and rack are produced.

Referring to the drawings in more detail, the numeral 1 indicates a closed automobile of the coach type, although it is to be understood that the present invention is adapted for use with any automobile of enclosed construction.

The automobile is provided in its sides with slots 2 of a number equal to the number of windows in each side of the automobile, although it will be apparent that in lieu of forming the specific slots the doors may be spaced slightly below the top of the doorways so as to provide spaces through which the shades may be projected. Mounted on the underside of the top 3 of the automobile are casings 4 preferably formed of sheet metal, there being one casing adjacent each slot. These casings are arranged in alignment transversely of the vehicle as indicated in Figures 2 and 3, so that individual shades are provided for each window.

The shade proper is indicated in Figure 6 by the numeral 5 and is also preferably formed from a blank of sheet metal. This metal plate is provided with a rear extension 6 provided with a longitudinal slot 7 and wings 8, 9 and 10. The extension 6 is adapted to be bent upon itself so as to provide a closed tubular extension as indicated in cross section in Figure 4; the parts 8 and 9 forming the sides and bottom wall of the tubular portion, while the part 10 forms an end thereof.

In one of the side walls of the tubular extension 6 a series of rack teeth 11 are formed by crimping the metal forming the side wall. This rack 11 is adapted to cooperate with a pinion 12 mounted on a shaft 13. Shaft 13 extends through the casing 4 and is provided with a knurled knob 14 by means of which the shaft and pinion are rotated. The shaft 13 is also provided with threads to receive a lock nut 15 by means of which the shaft may be locked against rotation, thereby securely locking the shade in either its inner or outer position as may be desired.

For the purpose of facilitating the operation of the shade to either its inner or outer position, as well as to more or less close the slot through which the shade is projected, a roller 16 is mounted adjacent the outer end of each casing 4 and supports the outer end of the shade 5.

The construction of shade as just described may be sold as a unit comprising the casing 4, shade 5, and the rack and pinion for operating the same; and it will be apparent that these units may be readily mounted on the underside of the top of the vehicle without the use of special tools or skilled labor, and may therefore be installed at very low cost. Moreover, these units in themselves may be fabricated at an extremely low price inasmuch as the shade and its operating rack are stamped as a unit from sheet metal, as is also the casing 4 in which it is mounted.

In the operation of the device the several units having been installed on the vehicle as heretofore described, any one or all of the shades may be readily projected to operative position by merely loosening the respective lock nuts 15 and rotating the knob 14 in the proper direction, after which the lock nut 15 will be turned so as to lock the shaft 13 against rotation and thus securing the shade in its projected position. With the shade in this position, the sun's rays are entirely cut off so far as passing through the upper portion of the window is concerned, and thus shields the eyes of the occupants of the vehicle.

From the foregoing description taken in connection with the accompanying drawings it will be apparent to those skilled in the art, that I have devised and exceedingly simple and inexpensive construction of automobile shade which can be sold as a unit at a very reasonable price; that it can be installed on the vehicle without the use of special tools or the employment of skilled labor; that the shades are individual to each window of the vehicle; that the devices may be operated from the interior of the vehicle while the same is in motion; and that when not in use the shades are entirely withdrawn from view and thus eliminates the possibility of presenting an unsightly appearance when the shades are not desired for use.

In accordance with the patent statutes I have described what I now believe to be the best embodiment of the invention, but I do not wish to be understood thereby as limiting myself or the scope of my invention, as many changes and modifications may be made therein without departing from the spirit of the invention; and all such I aim to include within the scope of the appended claims.

What I claim is:

1. A shade for automobiles formed from a blank of sheet metal and comprising a metal plate portion, an integral tubular extension formed on one end of the plate, and rack teeth formed on the interior of one wall of said extension.

2. The combination with an automobile having a window in a side thereof and a slot disposed above the window, of a casing mounted in alignment with the slot, a plate-like shade slidably mounted in said casing, a rack on said shade, a shaft extending into the casing, a pinion on said shaft meshing with the rack, and a lock-nut threaded to said shaft for locking the pinion against rotation.

3. The combination with an automobile having a window in a side thereof and a slot disposed above the same, of a casing mounted in alignment with the slot, a plate-like shade slidably mounted in the casing, an integral tubular extension formed on the inner end of the plate, rack teeth formed in one wall of said extension, a shaft extending through the casing and through said tubular extension, a pinion disposed in the tubular extension and keyed to said shaft.

HYMAN BERLIAWSKY.